United States Patent [19]
Spletzer

[11] Patent Number: 5,850,044
[45] Date of Patent: Dec. 15, 1998

[54] LOAD CELL

[75] Inventor: Barry L. Spletzer, Albuquerque, N. Mex.

[73] Assignee: Sandia National Laboratories, Albuquerque, N. Mex.

[21] Appl. No.: 960,851

[22] Filed: Oct. 30, 1997

[51] Int. Cl.$^6$ ........................................ G01L 1/00
[52] U.S. Cl. ................ 73/862.041; 73/862.044
[58] Field of Search ............... 73/775, 841, 847, 73/862.041, 862.042, 862.043, 862.044, 862.045

[56] References Cited

U.S. PATENT DOCUMENTS

| | | | |
|---|---|---|---|
| 3,695,096 | 10/1972 | Kutsay | 73/862.042 |
| 3,855,857 | 12/1974 | Claycomb | 73/862.045 |
| 5,186,042 | 2/1993 | Miyazaki | 73/862.041 |

Primary Examiner—Ronald Biegel
Attorney, Agent, or Firm—V. Gerald Grafe

[57] ABSTRACT

A load cell combines the outputs of a plurality of strain gauges to measure components of an applied load. Combination of strain gauge outputs allows measurement of any of six load components without requiring complex machining or mechanical linkages to isolate load components. An example six axis load cell produces six independent analog outputs, each directly proportional to one of the six general load components.

14 Claims, 8 Drawing Sheets

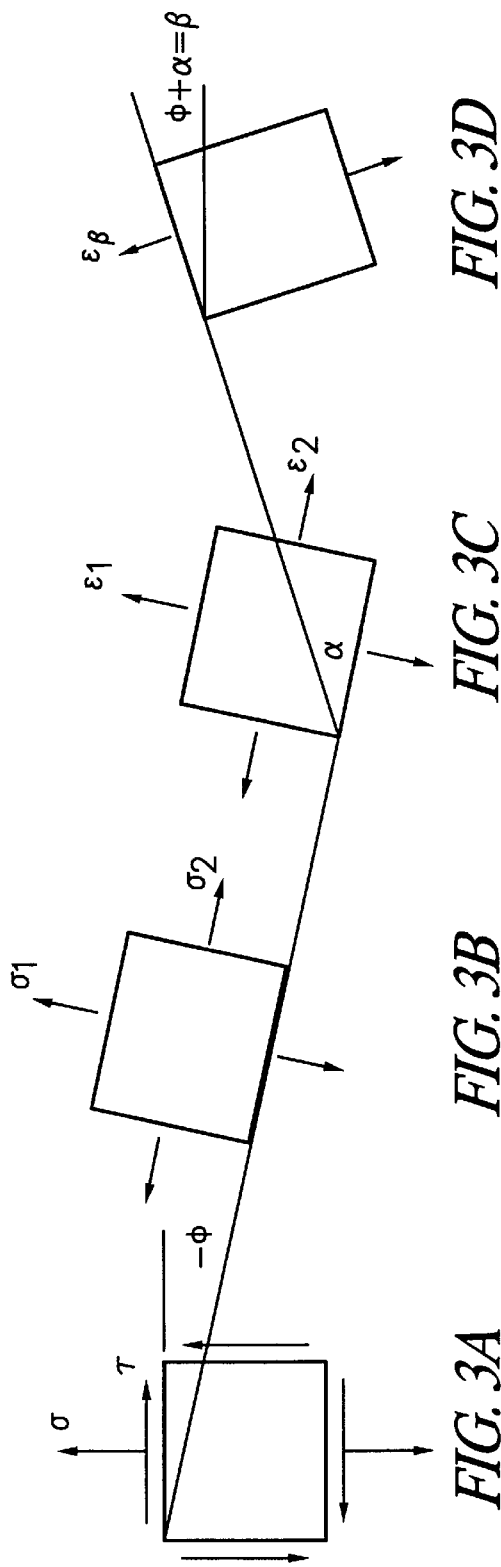
FIG. 3A
FIG. 3B
FIG. 3C
FIG. 3D
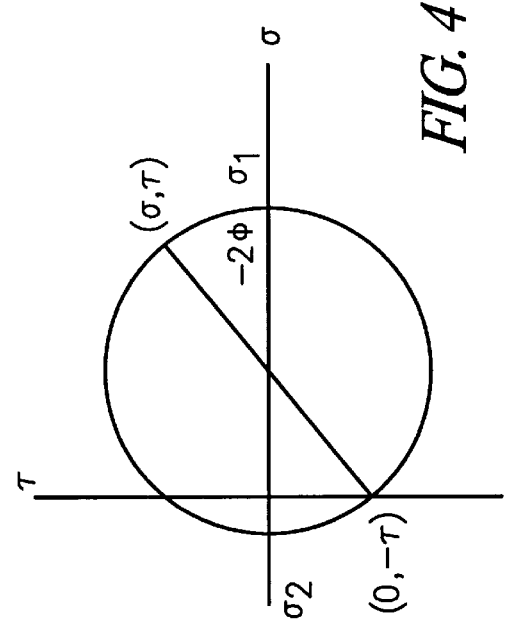
FIG. 4

| Component Sensed | Sensitivity (Volts/Load) | Gauge # | Azimuth (θ) | Gauge Angle (β) |
| --- | --- | --- | --- | --- |
| Axial Load, $P_z$ | $\dfrac{(1+\nu)}{2EA}FV$ | Pzg1 | $\theta_{Pz1}$ | 0 |
| | | Pzg2 | $\theta_{Pz2}$ | $\pi/2$ |
| | | Pzg3 | $\theta_{Pz1}+\pi$ | 0 |
| | | Pzg4 | $\theta_{Pz2}+\pi$ | $\pi/2$ |
| Torsion, $M_z$ | $\dfrac{\sqrt{\nu}D}{EJ}FV$ | Mzg1 | $\theta_{Mz1}$ | $-\beta\tau$ |
| | | Mzg2 | $\theta_{Mz2}$ | $\beta\tau$ |
| | | Mzg3 | $\theta_{Mz1}+\pi$ | $-\beta\tau$ |
| | | Mzg4 | $\theta_{Mz2}+\pi$ | $\beta\tau$ |
| X-Axis Moment, $M_x$ | $\dfrac{D\sin(\theta_{Mx})}{2EI}FV$ | Mxg1 | $\theta_{Mx}$ | 0 |
| | | Mxg2 | $-\theta_{Mx}$ | 0 |
| | | Mxg3 | $\pi-\theta_{Mx}$ | 0 |
| | | Mxg4 | $\pi+\theta_{Mx}$ | 0 |
| Y-Axis Moment, $M_y$ | $\dfrac{D\cos(\theta_{My})}{2EI}FV$ | Myg1 | $\pi-\theta_{My}$ | 0 |
| | | Myg2 | $\theta_{My}$ | 0 |
| | | Myg3 | $\pi+\theta_{My}$ | 0 |
| | | Myg4 | $-\theta_{My}$ | 0 |
| X Direction Force, $P_x$ | $\dfrac{2\sqrt{\nu}\sin(\theta_{Px})Q_{max}}{EI(D-d)}FV$ | Pxg1 | $\theta_{Px}$ | $\beta\tau$ |
| | | Pxg2 | $-\theta_{Px}$ | $\beta\tau$ |
| | | Pxg3 | $\pi-\theta_{Px}$ | $\beta\tau$ |
| | | Pxg4 | $\pi+\theta_{Px}$ | $\beta\tau$ |
| Y Direction Force, $P_y$ | $\dfrac{2\sqrt{\nu}\cos(\theta_{Py})Q_{max}}{EI(D-d)}FV$ | Pyg1 | $\theta_{Py}$ | $-\beta\tau$ |
| | | Pyg2 | $\pi-\theta_{Py}$ | $-\beta\tau$ |
| | | Pyg3 | $-\theta_{Py}$ | $-\beta\tau$ |
| | | Pyg4 | $\pi+\theta_{Py}$ | $-\beta\tau$ |

Figure 8

| Component Sensed | Sensitivity (Volts/Load) |
|---|---|
| Axial Load, $P_Z$ | $\dfrac{2(1+v)FV}{\pi ED^2(1-\rho^2)}$ |
| Torsion, $M_Z$ | $\dfrac{32FV\sqrt{v}}{\pi ED^3(1-\rho^4)}$ |
| X-Axis Moment, $M_X$ | $\dfrac{32\sin(\theta)FV}{\pi ED^3(1-\rho^4)}$ |
| Y-Axis Moment, $M_Y$ | $\dfrac{32\cos(\theta)FV}{\pi ED^3(1-\rho^4)}$ |
| X Direction Force, $P_X$ | $\dfrac{32\sqrt{v}\sin(\theta)(1-\rho^3)FV}{3\pi ED^2(1-\rho^4)(1-\rho)}$ |
| Y Direction Force, $P_Y$ | $\dfrac{32\sqrt{v}\cos(\theta)(1-\rho^3)FV}{3\pi ED^2(1-\rho^4)(1-\rho)}$ |

LOAD CELL

This invention was made with Government support under Contract DE-AC04-94AL85000 awarded by the U.S. Department of Energy. The Government has certain rights in the invention.

BACKGROUND OF THE INVENTION

This invention relates to the field of load cells, specifically load cells that measure torsion or shear at an angle to the cell's axis.

Load cells are used for measuring forces and moments along certain directions. Measurement of loads and moments about multiple axes can be beneficial in various research and manufacturing applications. Current multi-axis load cells, however, require complex machining and mechanical linkages to isolate loads along multiple axes. Loads that manifest only through shear stress at the load cell typically require especially complex machining or linkages for isolation. See, e.g., Meyer et al., U.S. Pat. No. 4,640,138; Meyer et al., U.S. Pat. No. 5,315,882; Mullin, U.S. Pat. No. 5,339,697; Rieck et al., U.S. Pat. No. 4,259,863; Ruoff, Jr. et al., U.S. Pat. No. 4,138,884. Current multi-axis load cells are consequently expensive to manufacture, and can be readily damaged by overloading. The frequency response of current load cells is also limited by the characteristics of the machining and mechanical linkages, precluding their use in applications with rapidly varying loads.

Many applications that might benefit from multi-axis load measurements are precluded by the high cost of current multi-axis load cells. Also, applications such as many robotics applications encounter widely varying loads. Some encounter unknown loading, making load cell damage due to overloading likely. Also, existing load cells can not be integrated into a robot link, complicating the robotic system.

There is a need for a multi-axis load cell that is simple and inexpensive to manufacture, that is unlikely to be damaged by widely varying loads, and that can be readily incorporated into a robotic system.

SUMMARY OF THE INVENTION

The present invention provides an improved load cell that is simple and inexpensive to manufacture, and that is capable of measuring a wide range of loads. The present invention uses strain gauges, mounted in novel arrangements on free surfaces of a load cell body, to measure loads.

Generally, six load components are of interest: axial load, axial moment (torsion), two loads at angles to the axis (typically along two axes mutually orthogonal and orthogonal to the cell axis), and moments about two axes at angles to the cell's axis (typically about two axes mutually orthogonal and orthogonal to the cell axis). Strain gauges measure axial surface strain along a given axis, and accordingly do not directly measure any of the six loads of interest. Placing sets of strain gauges at certain locations on free surfaces of the cell, however, can allow the gauge outputs to be combined to measure any of the six load components of interest individually.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

FIG. 3(a–d) illustrate the geometric relationships between the applied stress (FIG. 3a), the principal stresses (FIG. 3b), the principal strains (FIG. 3c) and a general axial strain (FIG. 3d).

FIG. 4 is a Mohr's stress circle for a typical surface element.

FIG. 8 is a summary of the normalized output relationships and azimuth constraints for six load components in a load cell according to the present invention.

FIG. 9 is a summary of the output factor for bridges relating the applied load to the voltage output in a load cell according to the present invention.

DETAILED DESCRIPTION OF THE INVENTION

The present invention provides an improved load cell that is simple and inexpensive to manufacture, and that is capable of measuring a wide range of loads. The present invention uses strain gauges, mounted in novel arrangements on free surfaces of a load cell body, to measure loads.

Figure 1:
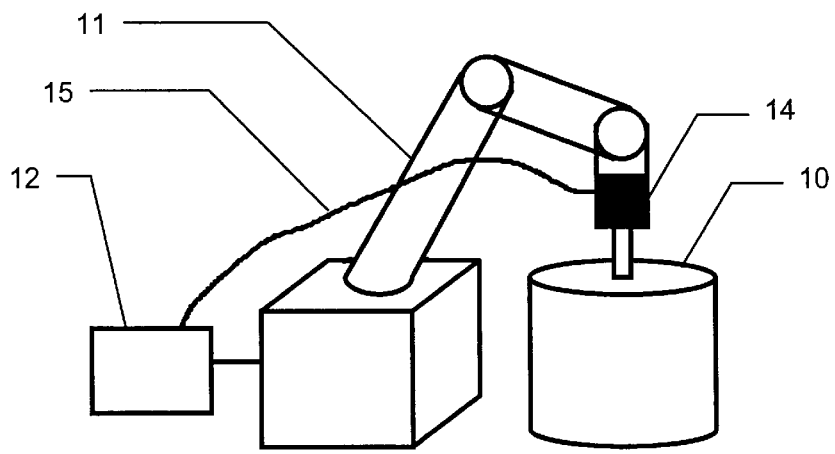
FIG. 1 is an illustration of an application of a multi-axis load cell.

FIG. 1 illustrates an example application of a load cell according to the present invention. A robot 11 operates on a workpiece 10. Controller 12 monitors and controls the operation of robot 11. Load cell 14 provides information via connection 15 to controller 12 concerning forces and moments exerted by or on robot 11. For example, load cell 14 can provide measurement of axial moment (or torsion) to allow controller 12 to direct robot 11 to apply a certain torque to a fastener. As another example, load cell 14 can provide measurement of general loading to allow controller to direct robot 11 to apply selected force to workpiece 10 during a finishing operation. As another example, load cell 14 can provide measurement of general loading to allow controller 12 to safely control robot 11 when unexpected high loads are encountered (as would be caused by collisions between robot 11 and objects unexpectedly within the workspace of robot 11).

Figure 2:
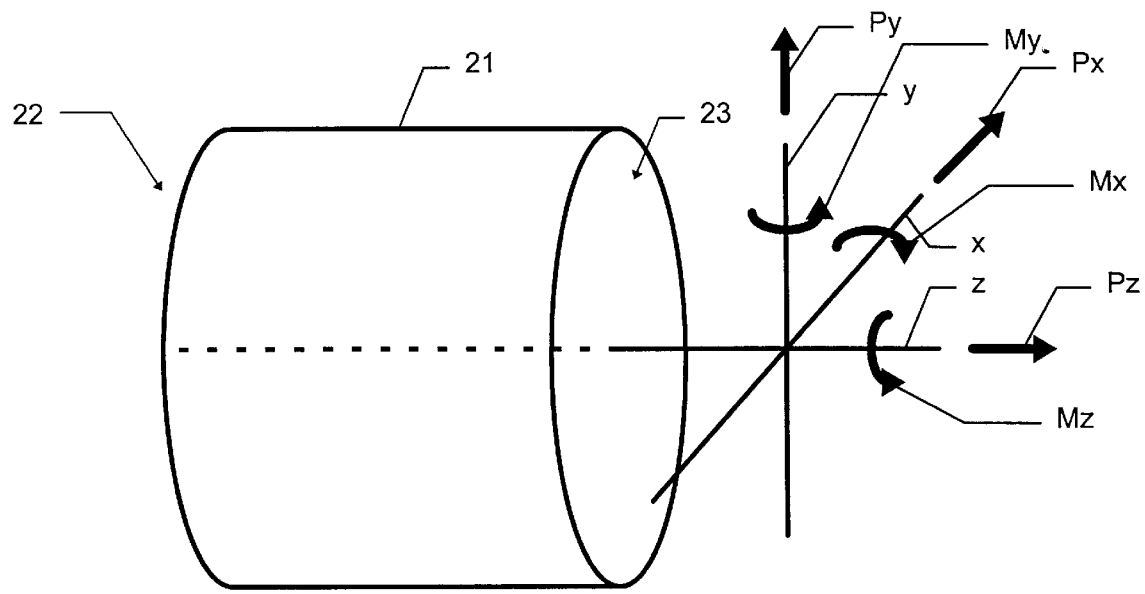
FIG. 2 is an illustration of general loading of a multi-axis load cell.

FIG. 2 illustrates general loading of a load cell. Load cell 21 is loaded at ends 22, 23. A coordinate system comprising three axes x, y, z is conventionally used to describe loading of the cell. A first axis z lies substantially parallel to the longitudinal axis of the cell 21. The other two axes x, y are mutually orthogonal, and are both orthogonal to the first axis z. General loading of cell 21 comprises force load components Px, Py, Pz along each of the three axes x, y, z and moment load components Mx, My, Mz about each of the three axes x, y, z. Moment load component Mz about the first axis z is often referred to as torsion. Force load component Pz along the first axis z is often referred to as axial load.

The present invention comprises strain gauges mounted at specified locations and specified orientations on free surfaces of a load cell body, where the load cell body material is characterized by its modulus of elasticity (E) and Poisson's ratio (v). A free surface of a load cell body is any surface that is sufficiently far from applied loads to be substantially unaffected by the resulting strain concentrations. Strain gauges mounted at locations and orientations according to the present invention allow a combination of strain gauges to directly measure a selected load component without interference from other load components.

The relationships among the gauge locations and orientations and sensitivity to particular load components are presented below. Various gauge locations and orientations can be determined using the presented relationships to realize load cells according to the present invention. The relationships are presented assuming an annular load cell body. The present invention can be practiced with other load cell body cross sections; an annular cross section is used in presenting the relationships so that well known but complicated geometric conversions do not hinder the comprehension of the present invention. The relationships are presented for all six load components (i.e., axial force, torsion, and force along and moments about two mutually orthogonal axes); load cells according to the present invention that measure less than all six load components can be realized by selecting the appropriate relationships.

Relationships Among Stress, Strain, Gauge Locations, and Gauge Orientation

Governing Stress-Strain Relationships

The governing relationships for a load cell according to the present invention can be understood by considering an annular segment subjected to generalized end loading conditions of both applied force and moment. On the inner and outer surfaces of the annular segment, the material is in a state of plane stress. In cylindrical coordinates, this implies that:

$$\sigma_r = \tau_{r\theta} = \tau_{rz} = 0 \tag{1}$$

Further, by Saint Venant's semi-inverse technique, it can be shown that, for generalized end loading of an annulus:

$$\sigma_\theta = \sigma_r = 0 \tag{2}$$

This leaves only two nonzero stress components ($\sigma_z$ and $\tau_{\theta z}$) which will be referred to as $\sigma$ and $\tau$. To determine the stresses from the measured strains, (and from there, the applied loads) a relationship must be developed between axial strain (that measured by a single element strain gauge) and applied stress. FIG. 3(a–d) illustrate the geometric relationships between the applied stress (FIG. 3a), the principal stresses (FIG. 3b), the principal strains (FIG. 3c) and a general axial strain (FIG. 3d).

Beginning with the applied stresses ($\sigma$ and $\tau$), the principal stresses ($\sigma_1$ and $\tau_2$) and the direction of the principal stresses relative to the applied stress can be determined by Mohr's stress circle for a typical surface element, shown in FIG. 4. The angle $\phi$ is defined as the counterclockwise angle from the $\sigma$ axis to the maximum principal stress ($\sigma_1$) axis.

From FIG. 4, expressions for the principal stresses and the angle $\phi$ are:

$$\sigma_1 = \frac{\sigma}{2}[1 + \sec(2\phi)] \tag{3}$$

$$\sigma_2 = \frac{\sigma}{2}[1 - \sec(2\phi)] \tag{4}$$

$$\phi = \frac{1}{2}\arctan\left(\frac{2\tau}{\sigma}\right) \tag{5}$$

The arc tangent in equation (5) must consider the signs of the numerator and denominator (yield values from $-\pi$ to $\pi$) otherwise the principal axes will be exchanged. For isotropic materials, the principal stress and strain axes are identical. Based on plane stress, the principal strains ($\epsilon_1$ and $\epsilon_2$) are:

$$\epsilon_1 = \frac{1}{E}(\sigma_1 - v\sigma_2) \tag{6}$$

$$\epsilon_2 = \frac{1}{E}(\sigma_2 - v\sigma_1) \tag{7}$$

Substituting the principal stress relations of equations (3), (4), and (5) into the principal strain relations of equations (6) and (7):

$$\epsilon_1 = \frac{\sigma}{2E}[(1-v) + (1+v)\sec(2\phi)] \tag{8}$$

$$\epsilon_2 = \frac{\sigma}{2E}[(1-v) - (1+v)\sec(2\phi)] \tag{9}$$

Figure 5:
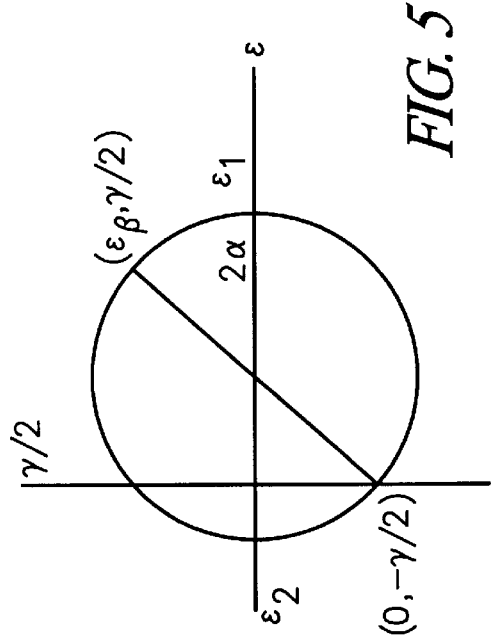
FIG. 5 is a Mohr's strain circle for a typical surface element.

The relationship between the principal strains and any general axial strain can be understood through Mohr's strain circle for a typical surface element, shown in FIG. 5. The shearing strain ($\gamma$) shown here will not be considered further since it does not contribute to the axial strain measured by strain gauges. The angle $\alpha$ is measured counterclockwise from the axis of maximum principal strain ($\epsilon_1$) to the direction where the general strain ($\epsilon_\beta$) is measured.

The resulting relationship between principal strain and the general strain $\epsilon_\beta$ is:

$$\epsilon_\beta = \frac{\epsilon_1 + \epsilon_2}{2} + \frac{\epsilon_1 - \epsilon_2}{2}\cos(2\alpha) \tag{10}$$

Substituting the relations between principal strain and applied stress (equations (8 and 9)):

$$\epsilon_\beta = \frac{\sigma}{2E}[(1-v) + (1+v)\cos(2\alpha)\sec(2\phi)] \tag{11}$$

Since $\phi$ and $\alpha$ are measured in the same direction, the direction of the measured strain ($\beta$) measured counterclockwise relative to the applied stress axes is simply:

$$\beta = \phi + \alpha \tag{12}$$

Figure 6:
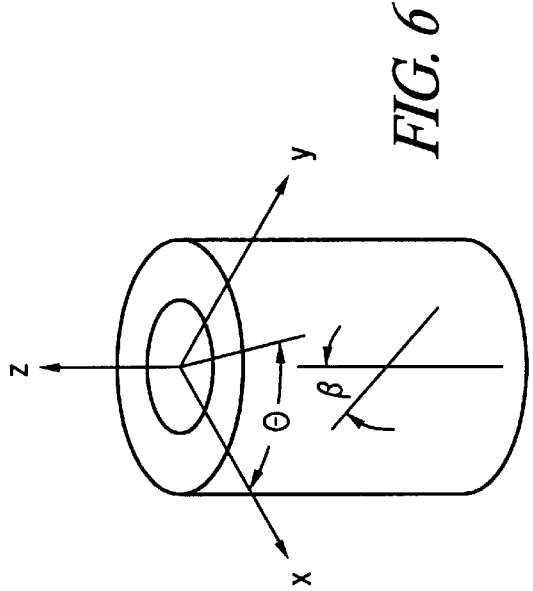
FIG. 6 is an illustration of the coordinate system used for the annulus.

In general, angle $\beta$ is known and is determined by the placement of the gauges. FIG. 6 illustrates the relationship of the angle $\beta$ to the longitudinal axis z of an annulus. The angles $\phi$ and $\alpha$ both are functions of the applied stresses and are not generally known. Combining equations (5, 11, and 12), the general strain ($\epsilon_\beta$) can be expressed in terms of $\beta$, $\sigma$, and $\tau$ only:

$$\epsilon_\beta = \frac{\sigma}{2E}[(1-v) + (1+v)\cos(2\beta)] + \frac{\tau}{E}(1+v)\sin(2\beta) \tag{13}$$

Equation (13) is the general relationship between stress and strain for an end loaded annulus with gauges oriented at any angle $\beta$ to the annulus axis.

Load-Stress Relationships

Now with the stress-strain relations determined, it is necessary to determine the load-stress relationships so that the two can be combined to produce the desired relations between load and strain. The load-strain relations can then be used to determine what strain measurements are needed to determine the individual components of the load.

Consider the contribution of the six load components to shear and axial stresses. A generalized loading consists of a force vector (P) made up of three components ($P_x$, $P_y$, and $P_z$), and a moment vector (M) also with three components ($M_x$, $M_y$, and $M_z$). A goal of load cell design can be to develop six analog voltage output signals each proportional to one of the load components and insensitive to all other loading. Since an annular load cell naturally conforms to a cylindrical coordinate system and the loads are in Cartesian coordinates, a relationship between the two systems is needed. FIG. 6 shows the coordinate system used for the annular load cell. The azimuth ($\theta$) is measured counterclockwise from the x axis. The direction at which the strain is measured, or the gauge angle ($\beta$) is measured counterclockwise from the z axis of the annulus as viewed from the outside.

The contributions to the total axial and shear stresses from each of the load components is needed. Since all relations are linear, addition of the individual stress contributions will yield expressions for the overall stresses. Each of the individual components is discussed below. Arbitrary numerical subscripts are used to identify the separate axial and shear stress components. The stresses and sectional properties presented are for an annular load cell with an outer diameter D and an inner diameter d.

The axial load ($P_z$) produces a uniform axial stress of:

$$\sigma_1 = \frac{P_z}{A} \tag{14}$$

where A is the cross-sectional area of the annulus.

$$A = \frac{\pi}{4}(D^2 - d^2) \tag{15}$$

The torsional load ($M_z$) produces pure shear of:

$$\tau_1 = \frac{M_z r}{J} \tag{16}$$

Where r is the radius at which the stress is measured and J is the polar moment of inertia of the annular cross-section, defined as:

$$J = \int_{d/2}^{D/2} 2\pi r^3 dr = \pi \frac{(D^4 - d^4)}{32} \tag{17}$$

The remaining moment components produce pure bending stress about the x and y axes. The resulting stress distribution, unlike the z axis moment, is a function of the azimuth ($\theta$). Using a right-handed rule convention, the bending stresses are:

$$\sigma_2 = \frac{M_x r \sin\theta}{I} \tag{18}$$

$$\sigma_3 = -\frac{M_y r \cos\theta}{I} \tag{19}$$

Where I is the moment of inertia about the centroid of the annular cross-section, defined as:

$$I = \int_0^{2\pi} \int_{d/2}^{D/2} r^3(\sin^2\theta) dr d\theta = \pi \frac{(D^4 - d^4)}{64} \tag{20}$$

Transverse shear presents a problem regarding the sign convention for shear stress. In general, no uniform sign convention exists to combine transverse shear stress with shear stress produced by torsion. However, since only a relationship between axial strain and applied load is needed, any convention that produces a consistent result for both transverse shear and torque can be used. Here, a positive shear stress will be defined as that produced by a positive torque about the axis of the annulus. The transverse shear stress at any location can be determined by resolving the contributing loads ($P_x$ and $P_y$) into a single vector acting perpendicular to the diameter where the shear stress is being determined. This avoids the problem of developing a sign convention to apply to the first moment of area (instead, the sign convention is maintained by the vector components of the load). Using this convention, the total transverse shear stress is:

$$\tau_2 = \frac{(-P_x \sin\theta + P_y \cos\theta) Q_{max}}{I(D-d)} \tag{21}$$

This relation is based on elementary beam theory which assumes that the shear stress is constant through the thickness of the body. For a thin walled annulus, this is a very good assumption. However, in the limiting case of a solid cylinder, this can result in errors of up to 4%. For this reason, a load cell with a thin annular design should be used to obtain greatest accuracy. $Q_{max}$ is the maximum first moment of area of the annulus defined by:

$$Q_{max} = \int_0^\pi \int_{d/2}^{D/2} r^2 (\sin\theta) dr d\theta = \frac{(D^3 - d^3)}{12} \tag{22}$$

The total axial stress is determined by summing the contributing components discussed above in equations (14), (18), and (19), resulting in:

$$\sigma = \frac{M_x r \sin\theta}{I} - \frac{M_y r \cos\theta}{I} + \frac{P_z}{A} \tag{23}$$

Likewise, the shear stress is determined by combining equations (16) and (21):

$$\tau = -\frac{P_x Q_{max} \sin\theta}{I(D-d)} + \frac{P_y Q_{max} \cos\theta}{I(D-d)} + \frac{M_z r}{J} \tag{24}$$

These two relations (equations (23) and (24)) can be combined with the general stress-strain relation of equation (13) to produce the final load-strain relationship:

$$\epsilon = \left( \frac{M_x r \sin\theta - M_y r \cos\theta}{2EI} + \frac{P_z}{2EA} \right)[(1-\nu)+(1+\nu)\cos(2\beta)] + \left( \frac{(-P_x \sin\theta + P_y \cos\theta) Q_{max}}{EI(D-d)} + \frac{M_z r}{EJ} \right)(1+\nu)\sin(2\beta) \tag{25}$$

This shows that a linear relationship exists between load and strain where, in general, all six components of the load contribute to the total strain and each of the proportionality constants are, in general, unique and are a function of gauge placement. It follows directly from this that the six components of load ($P_x$, $P_y$, $P_z$, $M_x$, $M_y$, $M_z$) can be determined from six independent strain measurements ($\epsilon_1$ through $\epsilon_6$) made at six orientations ($\beta_1$ through $\beta_6$) and six azimuth angles ($\theta_1$ through $\theta_6$) on the surface of the annulus. The only restriction is that all the resulting load-strain equations be linearly independent. A load cell devised this way will produce six strain measurements with each strain coupled to all six of the load components. A specific load cell design will have a constant 6×6 coefficient matrix coupling the strains to the loads. The load components are then determined by multiplying the inverse of the coefficient matrix by the vector composed of the measured strains.

While this design produces a workable six axis load cell, careful selection of the strain gauge orientation and azimuth can significantly simplify the load-strain relation, such that particular sets of gauges provide direct measures of individual load components.

Example Six Axis Load Cell
Selection of Strain Gauge Azimuth and Orientation The relationships presented above show that any six strain measurements could be used to determine the six load components. However, the coupling of the resulting equations requires a full solution to six simultaneous equations to determine the six components. In addition to being mathematically cumbersome, it is difficult to determine the amount of precision obtainable and the relative sensitivity of the system to load changes. By carefully selecting the gauge locations, the six equations can be largely uncoupled resulting in a simpler load cell.

Equation (13) shows that the axial stress ($\sigma$) is a function of the cosine of the gauge orientation ($\beta$) while shear stress ($\tau$) is a function of the sine. This means that the gauge orientation could be used to place gauges that are sensitive to only the shear or axial stress. Further, equations (23) and (24) show that the axial and shear stress are each a function of only three of the applied loads. This means that gauges sensitive to only axial or shear stress are insensitive to three of the six load components. Therefore, by placing gauges so that they are sensitive to only axial or shear stress, but not to both, the original set of six simultaneous equations is reduced to two sets of three equations each.

From equation (13), sensitivity to axial stress only can be achieved by positioning the gauges such that $\sin(2\beta)=0$, or at angles that are multiples of $\pi/2$. This yields two distinct orientations that are insensitive to shear stress ($\beta=0$, $\beta=\pi/2$). One orientation is aligned with the annulus z axis, the other is perpendicular to it.

Equation (13) also indicates that gauge orientations exist where the strain is a function of shear stress only and independent of axial stress. These values of $\beta$ are those where:

$$(1-\nu)+(1+\nu)\cos(2\beta)=0 \tag{26}$$

or $$\beta = n\pi \pm \frac{1}{2}\arccos\left(\frac{\nu-1}{\nu+1}\right) \tag{27}$$

As with axial stresses, this reduces to two distinct orientations:

$$\beta_\tau = \pm\frac{1}{2}\arccos\left(\frac{\nu-1}{\nu+1}\right) \tag{28}$$

The notation $\beta_\tau$ is used here to indicate the gauge orientation sensitive to shear only. This angle is a function of a well known material property (Poisson's ratio) only. Typical values for $\beta_\tau$ can be about 1 radian.

For axial and transverse gauge placement the relation between measured strain and axial stress reduces to:

$$\epsilon_0 = \frac{\sigma}{E} \tag{29}$$

$$\epsilon_{\pi/2} = \frac{-\nu\sigma}{E} \tag{30}$$

The subscript on $\epsilon$ indicates the gauge orientation relative to the z axis of the annulus. Substituting equation (14) into equation (13) for shear stress yields:

$$\epsilon_{\pm\beta_\tau} = \pm\frac{-2\tau\sqrt{\nu}}{E} \tag{31}$$

The sign convention shown here can be determined by inspection, keeping in mind the conventions previously discussed for $\beta$ and $\tau$.

Strain Gauge Configurations

Figure 7:
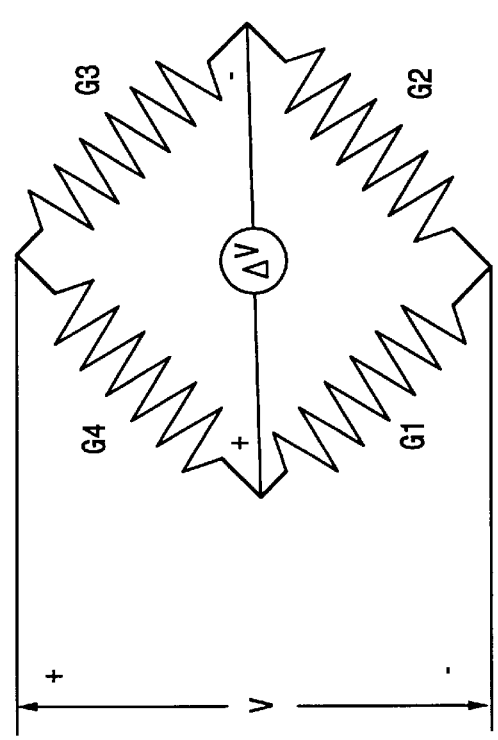
FIG. 7 is an illustration of a four active arm Wheatstone bridge.

Using impedance strain gauges, (for example, resistive foil or semiconductor strain gauges known to those skilled in the art) combinations of four strain measurements can be combined using a four active arm Wheatstone bridge shown in FIG. 7. In the figure, the polarity indicated is for tension in gauges G1, G3 and compression in gauges G2, G4.

The relationship between measured strain ($\epsilon$), gauge resistance (R), gauge factor (F), and change in gauge resistance ($\Delta R$) is:

$$\frac{\Delta R}{R} = F\epsilon \tag{32}$$

By combining four active strain gauges experiencing measured strains $\epsilon_1$ through $\epsilon_4$, and assuming small changes in resistance relative to the overall gauge resistance, the resulting voltage output ($\Delta V$) as a function of the bridge voltage (V) and the gauge factor (F) is:

$$\Delta V = \frac{VF}{4}(\epsilon_1 - \epsilon_2 + \epsilon_3 - \epsilon_4) \tag{33}$$

Now, using the values of $\beta$ previously shown to separate axial stress from shear stress, values of azimuth ($\theta$) can be chosen to produce four-arm bridges with each bridge sensitive to only one of the six load components. Specifically, $\beta=0$ and $\beta=\pi/2$ are used to measure axial stress and $\beta=\pm\beta_\tau$ are used for shear stress. In order to do this for a general case, a generalized four-arm bridge equation is presented. The form of this equation results from 1) equation (33) represented as an appropriate sum of the four gauge contributions, 2) equation (13) which showed that gauges mounted at the appropriate $\beta$ angles produce signals directly proportional to either axial or shear stress separately, and 3) equations (23) and (24) which showed that the axial and shear stress are each linear functions of three load components with coefficients that are trigonometric functions of the azimuth. The resulting generalized bridge output equation has the form:

$$Y = \sum_{i=1}^{4} (-1)^{i+1} K_i (A\sin\theta_i + B\cos\theta_i + C) \tag{34}$$

where Y is the normalized bridge output ($4\Delta V/VF$), i is the gauge number in the bridge, $K_i$ are the stress-strain coefficients (a function of $\beta$), and the term in parentheses is the stress at location $\theta_i$. As will be discussed, there are only two acceptable values of K (referred to generally as $K_A$ and $K_B$) for either axial or shear stress. The K value is determined by the $\beta$ angle of the gauge from equation 13. Of course, decoupling of axial and shear components limits the allowable values for $\beta$. The values of A, B and C are the coefficients from the stress-load equations. Specifically, for axial stresses:

$$K_{\beta=0} = \frac{1}{E} \;;\; K_{\beta=\pi/2} = -\frac{\nu}{E} \tag{35}$$

$$A = \frac{M_x r}{I} \;;\; B = -\frac{M_y r}{I} \;;\; C = \frac{P_z}{A} \tag{36}$$

For shear stresses:

$$K_{\beta=-\beta\tau} = \frac{2\sqrt{v}}{E} \quad ; K_{\beta=\beta\tau} = -\frac{2\sqrt{v}}{E} \tag{37}$$

$$A = -\frac{P_x Q_{max}}{I(D-d)} \quad ; B = \frac{P_y Q_{max}}{I(D-d)} \quad ; C = \frac{M_z D}{2J} \tag{38}$$

Since the form of the bridge output equation is identical, gauge placement strategies sensitive to only A, only B, and only C (and therefore sensitive to a single load component) can be used for both axial and shear stresses. These placement strategies will produce gauge bridges sensitive to each of the six load components.

Since there are only two unique values of K, insensitivity to C requires:

$$K_1 = K_2; K_3 = K_4$$

or $$K_1 = K_4; K_2 = K_3 \tag{39}$$

Since the assignment of gauge numbers to physical locations is arbitrary, the two sets of constraints are actually only a single constraint with different gauge numbering convention. The equation (39) constraint states that two pairs of adjacent gauges must have the same K. Therefore, only the first form of the constraint need be considered.

For a bridge to exhibit sensitivity to C, both allowable values of K are needed (using only a single K value makes the bridge insensitive to C by satisfying the equation (39) constraint). Using both values and avoiding the insensitivity condition of equation (39) leads to:

$$K_1 = K_3 = K_A; K_2 = K_4 = K_B; K_A \neq K_B \tag{40}$$

In other words, the K value of opposite arms of the bridge must be equal to exhibit sensitivity to C. Therefore, the normalized output of any bridge sensitive to C is:

$$Y = K_A(A(\sin\theta_1 + \sin\theta_3) + B(\cos\theta_1 + \cos\theta_3) + 2C) K_B(A(\sin\theta_2 + \sin\theta_4) + B(\cos\theta_2 + \cos\theta_4) + 2C) \tag{41}$$

If the bridge is to be sensitive to only C, the following must also be satisfied:

$$K_A(\sin\theta_1 + \sin\theta_3) = K_B(\sin\theta_2 + \sin\theta_4) \tag{42}$$

$$K_A(\cos\theta_1 + \cos\theta_3) = K_B(\cos\theta_2 + \cos\theta_4) \tag{43}$$

For general values of $K_A$ and $K_B$ this requires that the trigonometric terms on each side of equations (42) and (43) sum to zero (other conditions exist for specific K values).

This condition is met for equation (43) by:

$$\theta_{i+2} = \pm\theta_i \pm \pi \tag{44}$$

For equation (42), the relation is similar with a $\pi/2$ shift:

$$\theta_{i+2} - \frac{\pi}{2} = \pm\left(\theta_i - \frac{\pi}{2}\right) \pm \pi \tag{45}$$

Since only one set of azimuth values can be chosen for a bridge, and $+\pi$ and $-\pi$ are equivalent positions relative to any chosen $\theta$, the only acceptable set of values that satisfies both conditions is:

$$\theta_{i+2} = \theta_i + \pi \tag{46}$$

This is the only acceptable relative positioning of the gauges for axial and torsional loads (sensitivity to C) for independent $K_A$ and $K_B$ (other solutions are possible by examining the relationships between the two allowable values of K). Further, $K_A$ cannot equal $K_B$; if they are equal, sensitivity to C also disappears. The absolute positioning of the gauges in azimuth is unimportant. The only positioning requirement is that the elements of a gauge pair consisting of opposite arms of a Wheatstone bridge must differ by $\pi$ in azimuth. The normalized output of a bridge sensitive to C only is:

$$Y = 2(K_A - K_B)C \tag{47}$$

Next, the constraints for a configuration sensitive to A only are determined. The constraints on K for insensitivity to C have been developed, namely $K_1 = K_2 = K_A$ and $K_3 = K_4 = K_B$ (equation (39)). Incorporating these into the normalized bridge equation (34):

$$Y = K_A(A(\sin\theta_1 - \sin\theta_2) + B(\cos\theta_1 - \cos\theta_2)) + K_B(A(\sin\theta_3 - \sin\theta_4) + B(\cos\theta_3 - \cos\theta_4)) \tag{48}$$

To be sensitive to A only:

$$\cos\theta_1 = \cos\theta_2; \cos\theta_3 = \cos\theta_4 \tag{49}$$

As before, the gauges are related in pairs with no required relationship between the two pairs. Notice here that this requires pairing of adjacent arms (1–2 and 3–4) rather than opposite arms (1–3 and 2–4) as seen before.

The general solution for a gauge pair is $\theta_{2n} = 2m\pi \pm \theta_{2n-1}$
Assuming unique azimuths and removing multiples of $2\pi$:

$$\theta_{2n} = -\theta_{2n-1} \tag{50}$$

So gauge pairs must be located symmetrically about $\theta = 0$ (the x axis).

Applying this constraint, the normalized output for a bridge sensitive to A only is:

$$Y = 2(K_A \sin\theta_1 + K_B \sin\theta_3)A \tag{51}$$

Where $\theta_1$ and $\theta_3$ are independent and can be any value. Similarly, for sensitivity to B only:

$$\sin\theta_1 = \sin\theta_2; \sin\theta_3 = \sin\theta_4 \tag{52}$$

This reduces to:

$$\theta_2 = \pi - \theta_1; \theta_4 = \pi - \theta_3 \tag{53}$$

So the gauge pairs must be symmetric about $\theta = \pi/2$ (the y-axis). The normalized output for a bridge sensitive to B only is:

$$Y = 2(K_A \cos\theta_1 + K_B \cos\theta_3)B \tag{54}$$

As before, $\theta_1$ and $\theta_3$ can be selected to achieve a desired output level.

Final Bridge Arrangements and Relationships

The configuration of all four-arm bridges has now been determined. One important result is that no gauge is required to be located at a specific value of azimuth. This means that it is possible to construct six independent four-arm bridges with no two gauges required to be at the same position. This can be a very important consideration if the strain gauges are to be applied along a single circumference.

The output and arrangement of the bridges will now be determined for each of the six specific load elements.

For the axial load since both K values must be used, two gauges in opposite arms must be axial gauges ($\beta_\tau = 0$) and spaced $\pi$ apart in azimuth. The remaining two gauges must be circumferential gauges ($\beta_\tau = \pi/2$, since using more parallel gauges would render the bridge insensitive to axial load), also spaced $\pi$ apart in azimuth. The normalized output of the resulting bridge is determined by substituting equations (35) and (38) into (47):

$$Y = \frac{2(1+\nu)}{EA} P_z \tag{55}$$

The allowable azimuth constraints for this bridge are:

$$\theta_3 = \theta_1 + \pi; \theta_4 = \theta_2 + \pi \tag{56}$$

Where $\theta_1$ and $\theta_2$ can be any azimuth values.

For the torsional load, the same pattern is followed, pairs of opposite gauges spaced $\pi$ apart in azimuth, so the azimuth constraints are those of equation (56). Here though, the angle of the gauges to the axis must be $\beta_\tau$ for one pair and $-\beta_\tau$ for the other pair. The resulting output is determined by substituting equations (37) and (38) into (47):

$$Y = \frac{8r\sqrt{\nu}}{EJ} M_z \tag{57}$$

For moment about the x axis, adjacent arm gauge pairs (1–2 and 3–4) must be located symmetrically about $\theta=0$ or the x axis at locations of $\pm\theta_1$ and $\pm\theta_3$. Both $\theta_1$ and $\theta_3$ may be chosen independently. Therefore, the gauges may be applied as axial or circumferential pairs. Arbitrarily choosing which gauge orientation (axial or circumferential) to designate as $\theta_1$ leaves three distinct possible outputs for the bridge. Each of these outputs is also a function of $\theta_1$ and $\theta_3$. The three possibilities are determined by substituting the K values of equations (35) and (36) into equation (51):

All gauges axial:

$$Y_1 = \frac{2(\sin\theta_1 + \sin\theta_3)r}{EI} M_x \tag{58}$$

All gauges circumferential:

$$Y_2 = \frac{-2\nu(\sin\theta_1 + \sin\theta_3)r}{EI} M_x \tag{59}$$

One pair axial (1–2), one pair circumferential (3–4):

$$Y_3 = \frac{2(\sin\theta_1 - \nu\sin\theta_3)r}{EI} M_x \tag{60}$$

Choosing axial gauges for highest output and specifying:

$$\sin\theta_1 = \sin\theta_3 \tag{61}$$

$$\theta_2 = -\theta_1; \theta_3 = \pi - \theta_1; \theta_4 = \pi + \theta_1 \tag{62}$$

Note that the choice of axial gauges and the choice in equation (61) are both arbitrary, and can be chosen to simplify the resulting load cell. With a normalized output of:

$$Y = \frac{4r\sin\theta_1}{EI} M_x \tag{63}$$

Performing similar substitutions for sensitivity to moment about the y axis using equations (35), (38), and (54):

All gauges axial:

$$Y_1 = \frac{-2(\cos\theta_1 + \cos\theta_3)r}{EI} M_y \tag{64}$$

All gauges circumferential:

$$Y_2 = \frac{2\nu(\cos\theta_1 + \cos\theta_3)r}{EI} M_y \tag{65}$$

One pair axial (1–2), one pair circumferential (3–4):

$$Y_3 = \frac{-2(\cos\theta_1 - \nu\cos\theta_3)r}{EI} M_y \tag{66}$$

Again, using all axial gauges gives the maximum output. The selection of $\theta_1$ and $\theta_3$ is independent as before. Here the gauge pairs must be symmetric about the y axis ($\theta=\pi/2$). The appearance of negative signs in many of the outputs is to maintain the sign convention for the bridge and the right hand rule for moments. The convention requires a positive output from the bridge when a positive (tensile) strain is applied to gauge number one. As with the x axis moments, azimuth values can be chosen in pairs to simplify the sensitivity equation satisfying:

$$\cos\theta_1 = \cos\theta_3 \tag{67}$$

resulting in azimuth constraints of:

$$\theta_2 = \pi - \theta_1; \theta_3 = -\theta_1; \theta_4 = \pi + \theta_1 \tag{68}$$

This results in an output relation of:

$$Y = \frac{-4r\cos\theta_1}{EI} M_y \tag{69}$$

The derivation of the bridges for transverse shear response gauges follows the same format. The only change is that the values of the constants A, B, and C are given in equation (38) rather than equation (36). The relationships are somewhat simplified by the fact that the appropriate gauge angles are of the same magnitude but opposite in sign. The constraints on gauge angles are that members of a gauge pair (1–2) and (3–4) must be positioned at the same angle ($\beta$). The possibility of two gauge pairs positioned at either of two $\beta$ angles leads to four possible configurations. For shear load in the x direction, the four possible outputs are:

$$Y = -\frac{4\sqrt{\nu}\,(\pm\sin\theta_1 \pm \sin\theta_3)Q_{max}}{EI(D-d)} P_x \tag{70}$$

The signs on the sine terms are positive for a gauge pair at $+\beta_\tau$ and negative for a gauge pair at $-\beta_\tau$.

Since the functional dependence on $\theta$ is identical to that of moment about the x axis, the azimuth constraints are the same as those presented in equation (62). Placing all gauges at an angle of $-\beta_\tau$ results in maximum positive output for positive shear load:

$$Y = -\frac{8\sqrt{\nu}\,Q_{max}\sin\theta_1}{EI(D-d)} P_x \tag{71}$$

The relations for shear in the y direction are virtually identical with substitution of cosines for sines and the elimination of a minus sign needed above to preserve the sign convention. For y direction shear, the possible bridge outputs are:

$$Y = \frac{4\sqrt{\nu}\,(\pm\cos\theta_1 \pm \cos\theta_3)Q_{max}}{EI(D-d)} P_y \tag{72}$$

Similarly to the x direction shear, this equation corresponds to the output for bending about the y axis so the azimuth constraints are shown in equation (68). The normalized output is:

$$Y = \frac{8\sqrt{v}\ Q_{max}\cos\theta_1}{EI(D-d)} P_y \qquad (73)$$

The normalized output relationships and azimuth constraints for all six load components have now been developed. FIG. 8 summarizes these relationships.

The sensitivities shown are no longer normalized, that is they include the bridge excitation voltage (V) and the gauge factor (F). Further, all sensitivities are positive. The sign was changed on negative sensitivities by either changing the sign of the gauge angle ($\beta$) on all four gauges where appropriate or designating gauge number 2 rather than 1 as the reference gauge at angle $\theta$. This was done so that, for all bridge configurations listed, a positive load results in a positive output. The reference angle ($\theta$) is always assumed to be in the first quadrant. Since two way symmetry requires one gauge in each quadrant, this assumption does not introduce an additional constraint on the physical gauge placement. Finally, for torsion and bending loads, the radius of the gauge position (r) is assumed to be the outer surface of the annulus (D/2). This will be discussed in more detail in the next section.

Load Cell Material Parameters

The design of the load cell involves selection of material for the load cell body having a modulus of elasticity (E), Poisson's ratio (v) and the maximum allowable strain; specification of the inner (d) and outer (D) diameter; specification of the radius of gauge placement; and specification of the azimuth angles ($\theta$) of the bridges. This section presents some useful relationships to help optimize the design.

The radius of gauge placement is of importance for the bending and torsional response. Only two realistic choices exist, the inner and outer annulus diameters. For simplicity, the outer diameter (D) will be used. This can simplify gauge placement. It can also add the requirement that the gauges must be protected by an external shield. However, this requirement can be minor compared to the difficulty involved in accurately placing the gauges inside an annulus.

Material selection determines the modulus of elasticity and Poisson's ratio. The actual value of the elastic modulus is relatively unimportant. The value of greatest importance is the allowable strain before yielding. The allowable strain is directly proportional to the output of all the bridges so a large allowable strain is desired. Allowable strain is the ratio of yield stress to elastic modulus. Of common engineering materials, 7000 series aluminum with a yield strain of 0.7% is one of the highest, compared to cold rolled steel with a maximum strain of 0.2%. Strain gauges that are temperature compensated for aluminum are readily available.

The output factor for the bridges relates the applied load to the voltage output. Each of these can be expressed as a function of the elastic modulus (E), Poisson's ratio (v), the inner and outer diameter (D, d), gauge factor (F), applied bridge voltage (V), and the independent azimuths ($\theta$, $\theta'$) from Table 1. The six relationships are shown in FIG. 9. These are derived directly from FIG. 8 and equations (15), (17), (20), and (22). These relationships are all that are needed to design a load cell for a desired sensitivity. To simplify these relationships, one additional variable is introduced:

$$\rho = \frac{d}{D} \qquad (74)$$

In FIG. 9, the secondary azimuths ($\theta'$) have been selected to provide four way symmetry for all six bridges. This is not a requirement, although it can be more convenient for gauge placement. The variable $\theta$ can have a different value for each of the six bridges. The selection of $\theta$ can be used to adjust the relative bridge outputs or to select convenient locations for the gauges. If $\theta$ is used to adjust the output, the sensitivity of the three force bridges can be set to the same value by an appropriate choice of $\theta$.

The value of $\theta$ can be determined by setting the sensitivities equal and solving. For the x direction force bridge:

$$\theta = \arcsin\left(\frac{3(1+v)(1+\rho^2)(1-\rho)}{16\sqrt{v}\ (1-\rho^3)}\right) \qquad (75)$$

This value ranges from about 17–25 degrees depending on $\rho$. For the y direction force bridge, the equation is identical except that $\theta$ is determined by an arc cosine rather than an arc sine, giving a typical range of 65–73 degrees.

For moment about the x axis, the $\theta$ value can be chosen to match the z axis torque sensitivity:

$$\theta = \arcsin\sqrt{v} \qquad (76)$$

This is about 35 degrees. As before, the $\theta$ value for bending about the y axis uses the arc cosine rather than the arc sine, resulting in a value of 55 degrees.

The above solutions for $\theta$ provide a single sensitivity for all three loads and all three moments. This, in turn, requires less signal processing. However, the $\theta$ values determined will position the gauges a relatively short distance from the axis of the applied load. This means that the sensitivity is lower than that which might be achieved otherwise and that the contributions from other loads (which are canceled by the full bridge arrangement) are larger than otherwise. This combination could lead to some undesired sensitivity to other loads. In short, this is a design tradeoff between simplicity and accuracy that must be considered when selecting $\theta$ values.

One additional selection is possible to relate the force and moment sensitivities to each other. The sensitivity to force and moment cannot be identical because the two types of loads have different units (lb. vs. inch-lb.) However, for some selected moment arm, R (such as an inch, foot, centimeter, or meter), the design of the load cell can be adjusted to match the two sensitivities. For example, with a selected moment arm of one inch, the sensitivity can be designed so that the output for one pound on any force bridge matches the output at one inch-pound on any moment bridge. To do this, the following relationship must be satisfied:

$$R = \frac{(1+\rho^2)(1+v)}{16\sqrt{v}} D \qquad (77)$$

The annulus diameter and wall thickness can be adjusted to achieve this matching output. However, the range of adjustment is usually fairly limited and matched output may not always be possible. For example, a thin walled aluminum annulus requires a D/R ratio of 6.9 so a diameter of nearly 6.9 inches is needed to equate the output in lb. to that in in-lb.

In addition to the issues regarding bridge sensitivity, mechanical issues must also be considered. First among these is assuring that a true uniform strain field results from the loading. By St. Venant's principle, the strain gauges must be sufficiently far from the applied load and from any stress concentration to assure a uniform strain field. Although no concrete guidelines exist for what is "sufficiently far", a few times the thickness of the annulus wall can be sufficient.

Figure 10:
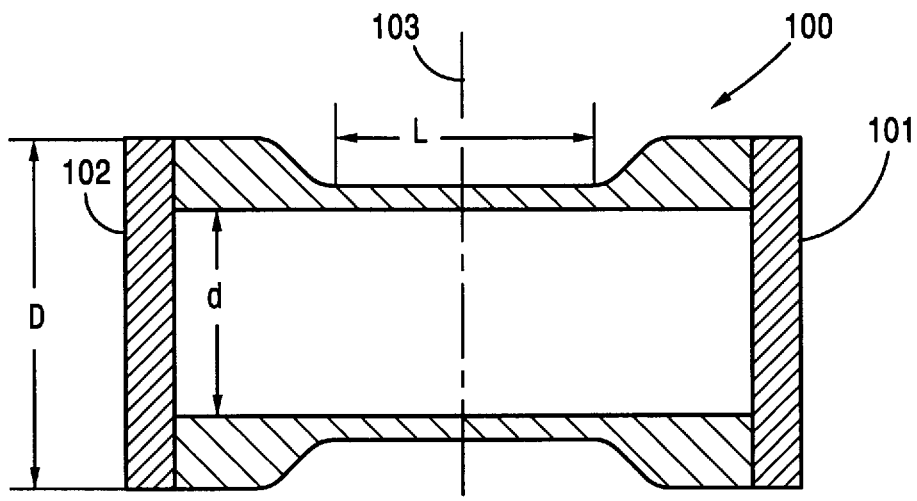
FIG. 10 is an illustration of a schematic of a cross section of a load cell annulus suitable for use in a load cell according to the present invention.

FIG. 10 shows a schematic of a cross section of a suitable load cell annulus 100.

Loads are applied to the load cell L by means of endplates 101, 102 and the gauges are located along the centerline 103 which is drawn midway around the annulus.

The sensitivity and maximum allowable load on the load cell will be determined by the elastic constants, the diameters, and the maximum allowable strain. In general, smaller diameter load cells will be more sensitive. For small diameters, it may be difficult to position all 24 gauges around the circumference. In such cases, the gauges can be split into multiple sets of gauges. In order to split the gauges into separate circumferences about the annulus, some basic conditions must be satisfied. First, since only the gauges for measuring the moments about the X and Y axes are sensitive to position along the load cell annulus, the eight gauges comprising the X and Y bending moment bridges must be located around the same circumference. Next, the distance vector to the applied load used to determine the moment loading must be measured from the circumference containing the X and Y bending moment bridges. Since each four gauge bridge depends on equal and opposite signals to provide cancellation of unwanted strains, any four gauge bridge must be completely contained on a single circumference. Finally, all gauges must be place sufficiently far from the ends of the uniform thin walled section of the annulus to be in a uniform strain field.

Construction of the Example Load Cell

Figure 11:
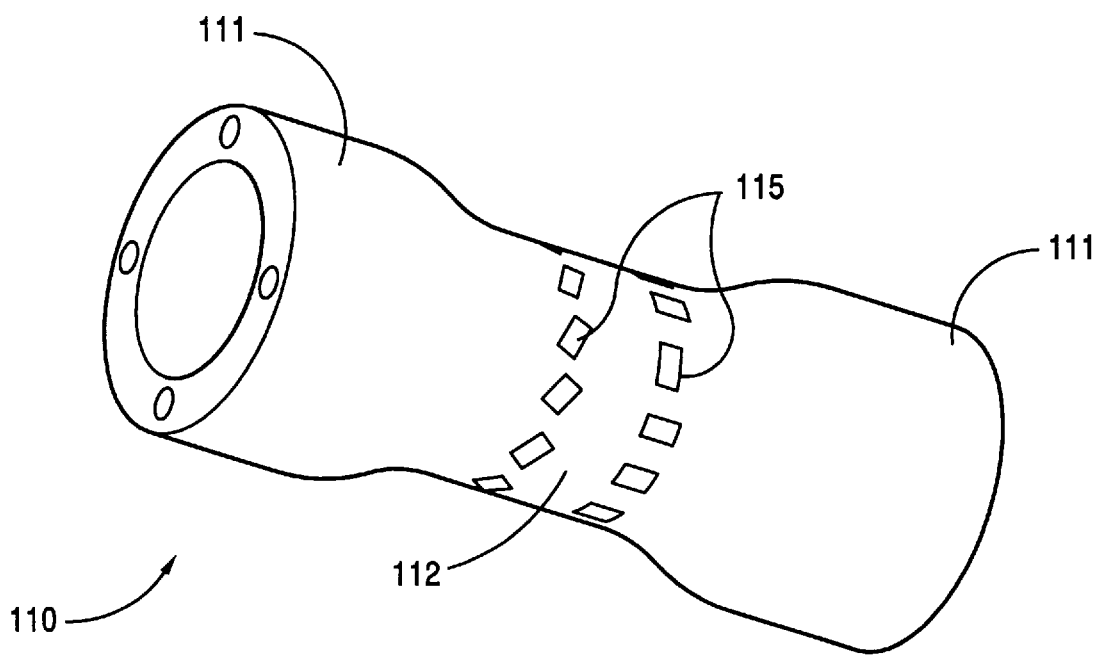
FIG. 11 is a pictorial view of an example load cell according to the present invention.

A six-axis load cell has been constructed based on instrumentation of an annulus with strain gauges. The load cell produces six independent analog outputs, each one directly proportional to one of the six generalized load components. The load cell is a simple tube with suitable ends to apply the loads and a number of strain gauges mounted on the annular surface. This design is intended to provide a rugged load cell with reasonably good resolution that is relatively inexpensive to manufacture and requires minimum processing electronics. FIG. 11 is a pictorial view of the example load cell 110. Ends 111 of load cell 110 can be adapted to receive loads. Strain gauges 115 mount with the outer surface of an annular section 112 of load cell 110, at locations and orientations as set forth previously.

Figure 12A:
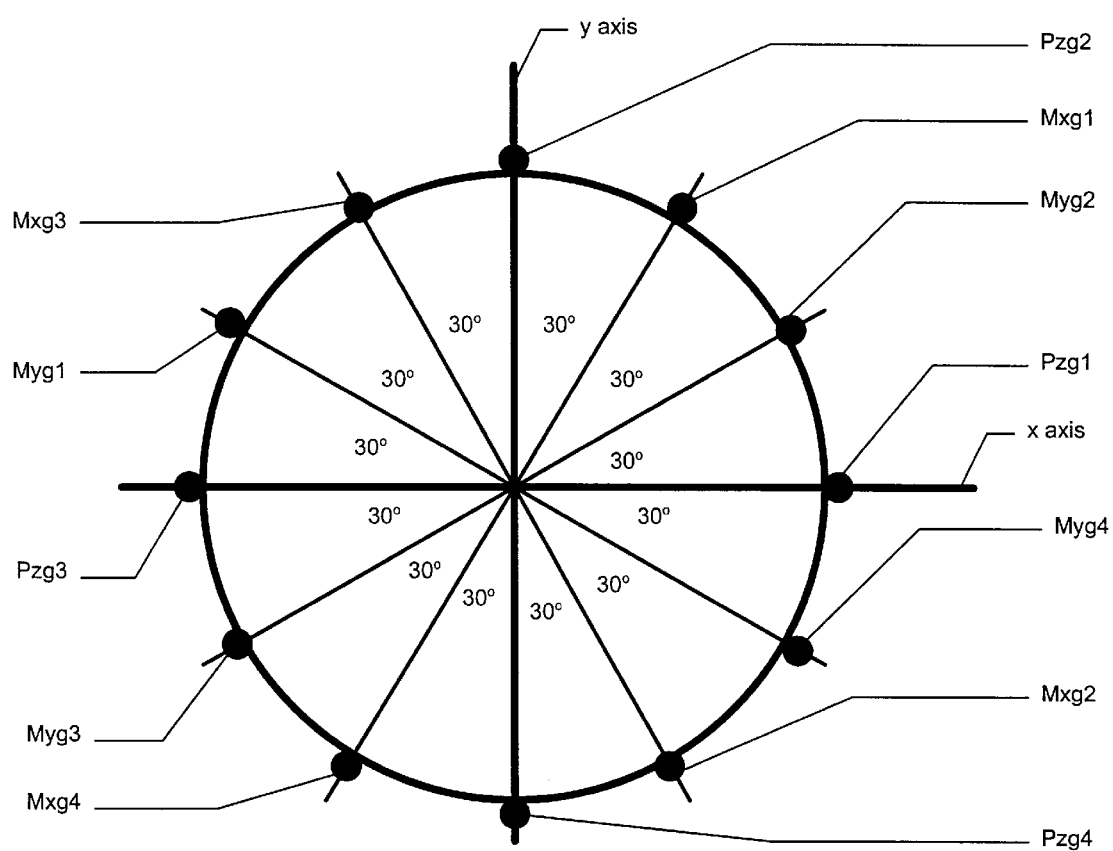
FIG. 12(a,b) is a pictorial representation of azimuthal gauge placement in an example load cell according to the present invention.
Figure 12B:
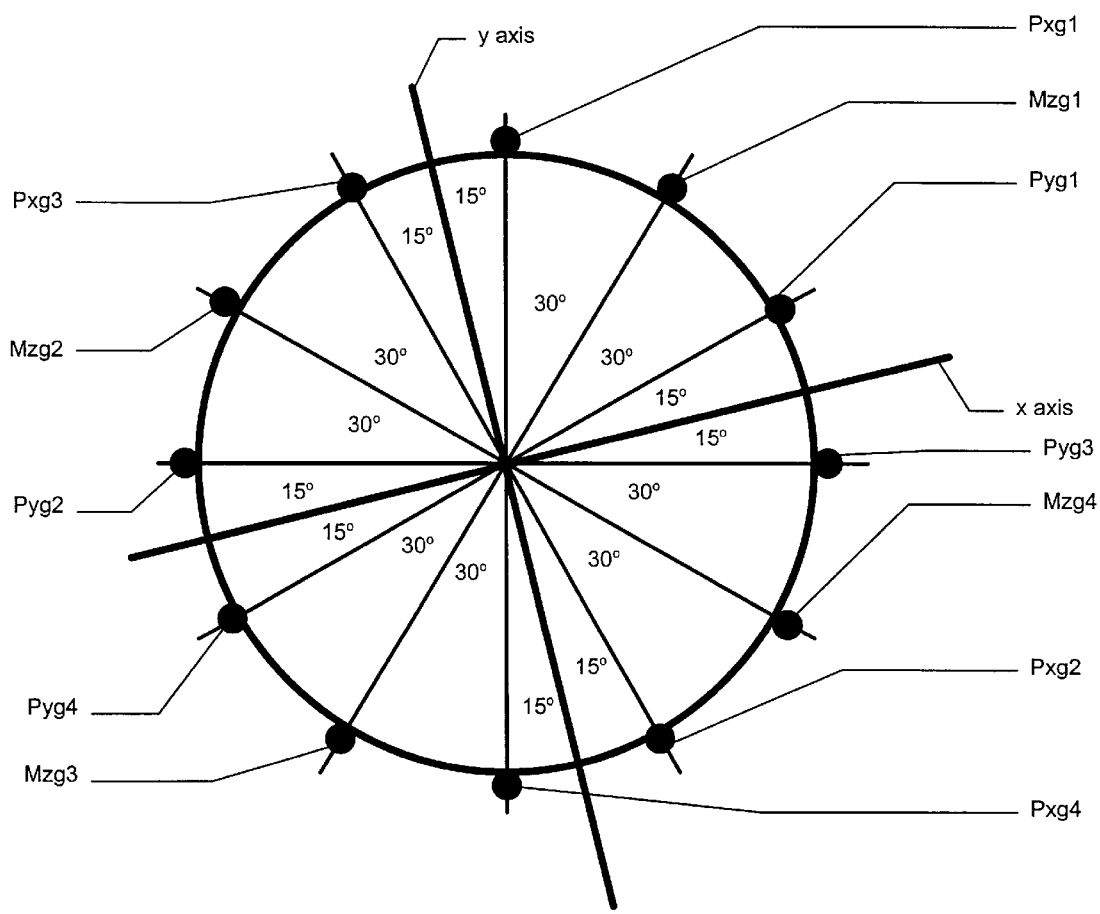

FIG. 8 shows that there are eight independent azimuth angles that must be chosen to specify the location of all 24 strain gages. FIGS. 12a and 12b illustrate an example of one such set of selected angles. In the figure, the angles chosen are $\theta_{Pz1}=0°$, $\theta_{Pz2}=90°$, $\theta_{Mz1}=45°$, $\theta_{Mz2}=135°$, $\theta_{Mx}=60°$, $\theta_{My}=30°$, $\theta_{Px}=75°$, and $\theta_{Py}=15°$. Selection of these angles provides equally spaced gages at steps of 15°. Other gage azimuth selections could be chosen as well. This particular set of angles was used in the construction of the load cell pictured in FIG. 11. The gages are located along two separate circumferences with the axial load and bending moment gages on one circumference and the torsion and shear gages on the other. This load cell is made of aluminum with a Poisson's ratio of 0.33 giving a βτ of 60°. The load cell has an annulus outer diameter of 2" and an inner diameter of 1⅞" the enlarged ends are provided to allow for bolt circles on each end to facilitate attachment to the loads. The system was tested using various static loads in a manner to apply each of the six load components separately. The testing verified that each of the six bridges is sensitive to only one of the six load components, that the load cell response is linear and that the sensitivity matches the predicted value.

The principles set forth above specifically for an annular load cell are also applicable to any prismatic shape (any cross-section as long as the cross-section is constant over a great enough length to eliminate strain concentrations). For any general shape, another form of the load-strain relationship exists. It can be derived by closed form analysis, numerical analysis, or experiment. In any event, the existence of a load strain relation where strain is a linear combination of the six applied load components is assured. This alone says that a six axis load cell can be constructed from any prismatic shape. The load strain relation will not typically have a simple trigonometric dependence on azimuth but can still be quite simple. An example is for a square tubular cross section where one of the load-strain relations for the outer surface is:

$$\epsilon = \left( \frac{-M_y D}{4EI} + \frac{P_z}{2EA} \right)[(1-\nu)+(1+\nu)\cos(2\beta)] + \left( \frac{P_y(D(D^2-c^2)-d(d^2-c^2))}{EI(D-d)} + \frac{M_z}{EK} \right)(1+\nu)\sin(2\beta) \quad (78)$$

This relation is for the surface normal to the x axis. Now D and d are the inner and outer dimensions of the square tube, c is the distance from the centerline to where the strain is measured. A, I, and K are defined as:

$$A = D^2 - d^2 \quad (79)$$

$$I = \frac{D^4 - d^4}{12} \quad (80)$$

$$K = \frac{(D+d)^2(D-d)}{4} \quad (81)$$

This particular formulation for K is valid for a thin wall thickness. No simple relation exists for a tube of any thickness. However, for any given thickness, K can be determined. By letting θ=0° in equation (25) the similarity between the circular and square forms is obvious. A second similar relation exists for the surface normal to the y axis.

Some decoupling of the loads from the strains is inherent by the very nature of the geometry. As with the annular case, the same β values will decouple shear and torsion from axial load and bending. These two types of decoupling are similar to that for circular geometry in that simple gage positioning rules and connection strategies will fully decouple the load components.

The decoupling of the six equations afforded by the use of circular geometry is not guaranteed to exist for a general shape. However, for a shape with sufficient axes of symmetry, decoupling can be achieved using bridges similar to the annular case presented above. Examples of suitable cross sectional shapes include: ellipsoidal, polygonal, filleted polygonal, and combinations thereof.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A load cell comprising:
   a) a body having a body axis, first and second ends adapted to receive a load applied thereto, made of a material having a Poisson's ratio (ν);
   b) a plurality of strain gauges disposed in an arrangement on free surfaces of the body; and
   c) indication means for indicating at least one load component of the applied load from the strain gauges, wherein d) the body has a substantially circular outer cross-section;
e) the load component comprises torsion;
f) the plurality of strain gauges comprises first, second, third, and fourth strain gauges; and
g) the strain gauges are mounted with a free surface of the body, the first strain gauge at a first location and in a first orientation to gauge strain of the body at a first orientation angle to the body axis, the second strain gauge at a second location and in a second orientation to gauge strain of the body at a second orientation angle to the body axis, the third strain gauge at a third location and in a third orientation to gauge strain of the body at a third orientation angle to the body axis, and the fourth strain gauge at a fourth location and in a fourth orientation to gauge strain of the body at a fourth orientation angle to the body axis, wherein:
  i) the first and third locations are substantially the same distance, measured parallel to the body axis, from one end of the body,
  ii) the second and fourth locations are substantially the same distance, measured parallel to the body axis, from one end of the body,
  iii) the second and fourth orientation angles are chosen from the group consisting of: substantially
  $$\frac{1}{2} \arccos\left(\frac{v-1}{v+1}\right),$$
  and substantially
  $$-\frac{1}{2} \arccos\left(\frac{v-1}{v+1}\right);$$
  iv) the first and third orientation angles are substantially the negative of the second orientation angle;
  v) the third location is substantially $\pi$ radians, measured in the plane normal to the body axis, from the first location, and
  vi) the fourth location is substantially $\pi$ radians, measured in the plane normal to the body axis, from the second location.

2. A load cell according to claim 1, wherein:
a) the first, second, third, and fourth strain gauges comprise impedance strain gauges; and
b) the indication means comprises a four arm bridge, wherein:
  i) a first terminal of the first strain gauge is electrically connected to a first terminal of the second strain gauge;
  ii) a first terminal of the third strain gauge is electrically connected to a first terminal of the fourth strain gauge;
  iii) a second terminal of the first strain gauge is electrically connected to a second terminal of the fourth strain gauge; and
  iv) a second terminal of the second strain gauge is electrically connected to a second terminal of the third strain gauge.

3. A load cell comprising:
a) a body having a body axis, first and second ends adapted to receive a load applied thereto, made of a material having a Poisson's ratio (v);
b) a plurality of strain gauges disposed in an arrangement on free surfaces of the body; and
c) indication means for indicating at least one load component of the applied load from the strain gauges, wherein
d) the body has a substantially circular outer cross-section;
e) the load component comprises force along a second axis substantially orthogonal to the body axis;
  f) the plurality of strain gauges comprises first, second, third, and fourth strain gauges; and
g) the plurality of strain gauges are mounted with a free surface of the body, the first strain gauge at a first location and in a first orientation to gauge strain of the body at a first orientation angle to the body axis, the second strain gauge at a second location and in a second orientation to gauge strain of the body at a second orientation angle to the body axis, the third strain gauge at a third location and in a third orientation to gauge strain of the body at a third orientation angle to the body axis, and the fourth strain gauge at a fourth location and in a fourth orientation to gauge strain of the body at a fourth orientation angle to the body axis, wherein:
  i) the first and fourth locations are substantially the same distance, measured parallel to the body axis, from one end of the body;
  ii) the second and third locations are substantially the same distance, measured parallel to the body axis, from one end of the body;
  iii) the first, second, third, and fourth orientation angles are chosen from the group consisting of: substantially
  $$\frac{1}{2} \arccos\left(\frac{v-1}{v+1}\right),$$
  and substantially
  $$-\frac{1}{2} \arccos\left(\frac{v-1}{v+1}\right);$$
  iv) the first location is at a first location angle, measured from the second axis in a plane normal to the body axis;
  v) the second location is at a second location angle substantially the negative of the first location angle, measured from the second axis in a plane normal to the body axis, from the first location;
  vi) the third location is at a third location angle substantially $\pi$ radians minus the first location angle, measured from the second axis in a plane normal to the body axis, from the first location; and
  vii) the fourth location is at a fourth location angle substantially $\pi$ radians plus the first location angle, measured from the second axis in a plane normal to the body axis, from the first location.

4. A load cell according to the claim 3, wherein:
a) the first, second, third, and fourth strain gauges comprise impedance strain gauges; and
b) the indication means comprises a four arm bridge, wherein:
  i) a first terminal of the first strain gauge is electrically connected to a first terminal of the second strain gauge;
  ii) a first terminal of the third strain gauge is electrically connected to a first terminal of the fourth strain gauge;

iii) a second terminal of the first strain gauge is electrically connected to a second terminal of the fourth strain gauge; and iv) a second terminal of the second strain gauge is electrically connected to a second terminal of the third strain gauge.

5. A load cell comprising:

a) a body having a body axis, first and second ends adapted to receive a load applied thereto, made of a material having a Poisson's ratio (v);

b) a plurality of strain gauges disposed in an arrangement on free surfaces of the body; and c) indication means for indicating at least one load component of the applied load from the strain gauges, wherein d) the body has a substantially circular outer cross-section;

e) the load component comprises torsion and force along a second axis substantially orthogonal to the body axis;

f) the plurality of strain gauges comprises first, second, third, and fourth torsion strain gauges and first, second, third, and fourth force strain gauges; and g) the plurality of strain gauges are mounted with free surfaces of the body:

i) the first torsion strain gauge mounted at a first torsion location and in a first torsion orientation to gauge strain of the body at a first torsion orientation angle to the body axis, the second torsion strain gauge mounted at a second torsion location and in a second torsion orientation to gauge strain of the body at a second torsion orientation angle to the body axis, the third torsion strain gauge mounted at a third torsion location and in a third torsion orientation to gauge strain of the body at a third torsion orientation angle to the body axis, and the fourth torsion strain gauge mounted at a fourth torsion location and in a fourth torsion orientation to gauge strain of the body at a fourth torsion orientation angle to the body axis, wherein:

a) the first and third torsion locations are substantially the same distance, measured parallel to the body axis, from one end of the body;

b) the second and fourth torsion locations are substantially the same distance, measured parallel to the body axis, from one end of the body;

c) the second and fourth torsion orientation angles are chosen from the group consisting of: substantially $$\frac{1}{2} \arccos\left(\frac{v-1}{v+1}\right),$$

and substantially $$-\frac{1}{2} \arccos\left(\frac{v-1}{v+1}\right);$$

d) the first and third torsion orientation angles are substantially the negative of the second torsion orientation angle;

e) the third torsion location is substantially π radians, measured in the plane normal to the body axis, from the first torsion location; and f) the fourth torsion location is substantially π radians, measured in the plane normal to the body axis, from the second torsion location; and ii) the first force strain gauge mounted at a first force location and in a first force orientation to gauge strain of the body at a first force orientation angle to the body axis, the second force strain gauge mounted at a second force location and in a second force orientation to gauge strain of the body at a second force orientation angle to the body axis, the third force strain gauge mounted at a third force location and in a third force orientation to gauge strain of the body at a third force orientation angle to the body axis, and the fourth force strain gauge mounted at a fourth force location and in a fourth force orientation to gauge strain of the body at a fourth force orientation angle to the body axis, wherein:

a) the first and fourth force locations are substantially the same distance, measured parallel to the body axis, from one end of the body;

b) the second and third force locations are substantially the same distance, measured parallel to the body axis, from one end of the body;

c) the first, second, third, and fourth force orientation angles are chosen from the group consisting of: substantially $$\frac{1}{2} \arccos\left(\frac{v-1}{v+1}\right),$$

and substantially $$-\frac{1}{2} \arccos\left(\frac{v-1}{v+1}\right);$$

d) the first force location is at a first force location angle, measured from the second axis in a plane normal to the body axis;

e) the second force location is at a second force location angle substantially the negative of the first force location angle, measured from the second axis in a plane normal to the body axis, from the first force location;

f) the third force location is at a third force location angle substantially π radians minus the first force location angle, measured from the second axis in a plane normal to the body axis, from the first force location; and g) the fourth force location is at a fourth force location angle substantially π radians plus the first force location angle, measured from the second axis in a plane normal to the body axis, from the first force location.

6. A load cell according to claim 5, wherein:

a) the first, second, third, and fourth torsion strain gauges comprise impedance strain gauges;

b) the first, second, third, and fourth force strain gauges comprise impedance strain gauges; and c) the indication means comprises a torsion four arm bridge and a force four arm bridge, wherein:

i) a first terminal of the first torsion strain gauge is electrically connected to a first terminal of the second torsion strain gauge;

ii) a first terminal of the third torsion strain gauge is electrically connected to a first terminal of the fourth torsion strain gauge;

iii) a second terminal of the first torsion strain gauge is electrically connected to a second terminal of the fourth torsion strain gauge; and iv) a second terminal of the second torsion strain gauge is electrically connected to a second terminal of the third torsion strain gauge;
v) a first terminal of the first force strain gauge is electrically connected to a first terminal of the second force strain gauge;
vi) a first terminal of the third force strain gauge is electrically connected to a first terminal of the fourth force strain gauge;
vii) a second terminal of the first force strain gauge is electrically connected to a second terminal of the fourth force strain gauge; and
viii) a second terminal of the second force strain gauge is electrically connected to a second terminal of the third force strain gauge.

7. A load cell comprising:
a) a body having a body axis, first and second ends adapted to receive a load applied thereto, made of a material having a Poisson's ratio (v);
b) a plurality of strain gauges disposed in an arrangement on free surfaces of the body; and
c) indication means for indicating at least one load component of the applied load from the strain gauges, wherein
d) the body has a substantially circular outer cross-section;
e) the load component comprises axial load, load along a x-axis substantially orthogonal to the body axis, and load along a y-axis substantially orthogonal to the body axis and substantially orthogonal to the x axis;
f) the plurality of strain gauges comprises first, second, third, and fourth axial load gauges, first, second, third, and fourth x-axis load gauges, and first, second, third, and fourth y-axis load gauges; and
g) the plurality of strain gauges are mounted with a free surface of the body:
  i) the first and third axial load gauges mounted substantially the same distance, measured parallel to the body axis, from one end of the body, and mounted to gauge strain of the body substantially parallel to the body axis, and mounted substantially π radians apart, measured in the plane normal to the body axis;
  ii) the second and fourth axial load gauges are mounted substantially the same distance, measured parallel to the body axis, from one end of the body, and mounted to gauge strain of the body substantially normal to the body axis, and mounted substantially π radians apart, measured in the plane normal to the body axis;
  iii) the first and fourth x-axis load gauges mounted substantially the same distance, measured parallel to the body axis, from one end of the body, and mounted to gauge strain of the body at a x-axis load angle, measured relative to the body axis, chosen from the group consisting of: substantially $$\frac{1}{2} \arccos\left(\frac{v-1}{v+1}\right),$$

and substantially $$-\frac{1}{2} \arccos\left(\frac{v-1}{v+1}\right),$$

and mounted substantially π radians apart, measured in the plane normal to the body axis;
  iv) the second and third x-axis load gauges mounted substantially the same distance, measured parallel to the body axis, from one end of the body, and mounted to gauge strain of the body at the x-axis load angle, measured relative to the body axis, the second x-axis load gauge mounted substantially the negative of the angle of the first x-axis load gauge, measured from the x-axis in the plane normal to the body axis, the third x-axis load gauge mounted substantially π radians from the second x-axis load gauge, measured in the plane normal to the body axis;
  v) the first and fourth y-axis load gauges mounted substantially the same distance, measured parallel to the body axis, from one end of the body, and mounted to gauge strain of the body at a y-axis load angle, measured relative to the body axis, chosen from the group consisting of: substantially $$\frac{1}{2} \arccos\left(\frac{v-1}{v+1}\right),$$

and substantially $$-\frac{1}{2} \arccos\left(\frac{v-1}{v+1}\right),$$

and mounted substantially π radians apart, measured in the plane normal to the body axis; and
  vi) the second and third y-axis load gauges mounted substantially the same distance, measured parallel to the body axis, from one end of the body, and mounted to gauge strain of the body at the y-axis load angle, measured relative to the body axis, the third y-axis load gauge mounted substantially the negative of the angle of the first y-axis load gauge, measured from the x-axis in the plane normal to the body axis, the second y-axis load gauge mounted substantially π radians from the second y-axis load gauge, measured in the plane normal to the body axis.

8. A load cell according to claim 7, wherein:
a) the first, second, third, and fourth axial load gauges, the first, second, third, and fourth x-axis load gauges, and the first, second, third, and fourth y-axis load gauges comprise impedance strain gauges; and
b) the indication means comprises a axial load four arm bridge, a x-axis load four arm bridge, and a y-axis load four arm bridge, wherein:
  i) the first and third axial load gauges are in two opposite arms of the axial load bridge, and the second and fourth axial load gauges are in two opposite arms of the axial load bridge;
  ii) the first and third x-axis load gauges are in two opposite arms of the x-axis load bridge, and the second and fourth x-axis load gauges are in two opposite arms of the x-axis load bridge; and
  iii) the first and third y-axis load gauges are in two opposite arms of the y-axis load bridge, and the second and fourth y-axis load gauges are in two opposite arms of the y-axis load bridge.

9. A load cell comprising:
a) a body having a body axis, first and second ends adapted to receive a load applied thereto, made of a material having a Poisson's ratio (v);
b) a plurality of strain gauges disposed in an arrangement on free surfaces of the body; and c) indication means for indicating at least one load component of the applied load from the strain gauges, wherein d) the body has a substantially circular outer cross-section;

e) the load component comprises moment about the body axis, moment about a x-axis substantially orthogonal to the body axis, and moment about a y-axis substantially orthogonal to the body axis and substantially orthogonal to the x axis;

f) the plurality of strain gauges comprises first, second, third, and fourth axial moment gauges, first, second, third, and fourth x-axis moment gauges, and first, second, third, and fourth y-axis moment gauges; and g) the plurality of strain gauges are mounted with a free surface of the body:

i) the first and third axial moment gauges mounted substantially the same distance, measured parallel to the body axis, from one end of the body, and mounted to gauge strain of the body at an axial moment angle, measured relative to the body axis, chosen from the group consisting of: substantially $$\frac{1}{2} \arccos\left(\frac{\nu - 1}{\nu + 1}\right),$$

and substantially $$-\frac{1}{2} \arccos\left(\frac{\nu - 1}{\nu + 1}\right),$$

and mounted substantially $\pi$ radians apart, measured in the plane normal to the body axis;

ii) the second and fourth axial moment gauges are mounted substantially the same distance, measured parallel to the body axis, from one end of the body, and mounted to gauge strain of the body at an angle, measured relative to the body axis, of substantially the negative of the axial moment angle, and mounted substantially $\pi$ radians apart, measured in the plane normal to the body axis;

iii) the first and fourth x-axis moment gauges mounted substantially the same distance, measured parallel to the body axis, from one end of the body, and mounted to gauge strain of the body substantially parallel to the body axis, and mounted substantially $\pi$ radians apart, measured in the plane normal to the body axis;

iv) the second and third x-axis moment gauges mounted substantially the same distance, measured parallel to the body axis, from one end of the body, and mounted to gauge strain of the body substantially parallel to the body axis, the second x-axis moment gauge mounted substantially the negative of the angle of the first x-axis moment gauge, measured from the x-axis in the plane normal to the body axis, the third x-axis moment gauge mounted substantially $\pi$ radians from the second x-axis moment gauge, measured in the plane normal to the body axis;

v) the first and fourth y-axis moment gauges mounted substantially the same distance, measured parallel to the body axis, from one end of the body, and mounted to gauge strain of the body substantially parallel to the body axis, and mounted substantially $\pi$ radians apart, measured in the plane normal to the body axis; and vi) the second and third y-axis moment gauges mounted substantially the same distance, measured parallel to the body axis, from one end of the body, and mounted to gauge strain of the body substantially parallel to the body axis, measured relative to the body axis, the second y-axis moment gauge mounted substantially the negative of the angle of the fourth y-axis moment gauge, measured from the x-axis in the plane normal to the body axis, the third y-axis moment gauge mounted substantially $\pi$ radians from the second y-axis moment gauge, measured in the plane normal to the body axis.

10. A load cell according to claim 9, wherein:

a) the first, second, third, and fourth axial moment gauges, the first, second, third, and fourth x-axis moment gauges, and the first, second, third, and fourth y-axis moment gauges comprise impedance strain gauges; and b) the indication means comprises an axial moment four arm bridge, a x-axis moment four arm bridge, and a y-axis moment four arm bridge, wherein:

i) the first and third axial moment gauges are in two opposite arms of the axial moment bridge, and the second and fourth axial moment gauges are in two opposite arms of the axial moment bridge;

ii) the first and third x-axis moment gauges are in two opposite arms of the x-axis moment bridge, and the second and fourth x-axis moment gauges are in two opposite arms of the x-axis moment bridge;

iii) the first and third y-axis moment gauges are in two opposite arms of the y-axis moment bridge, and the second and fourth y-axis moment gauges are in two opposite arms of the y-axis moment bridge.

11. A load cell comprising:

a) an annular body having a body axis, first and second ends, a second axis substantially orthogonal to the body axis, made from a material characterized by a Poisson's ratio ($\nu$);

b) a first pair of torsion strain gauges mounted with free surfaces of the body at locations substantially the same distance, measured along the body axis, from one end of the body, and separated by substantially $\pi$ radians from each other, measured in a plane normal to the body axis, and mounted to gauge strain of the body at a first torsion angle to the body axis chosen from the group consisting of: substantially $$\frac{1}{2} \arccos\left(\frac{\nu - 1}{\nu + 1}\right),$$

and $$\text{substantially} -\frac{1}{2} \arccos\left(\frac{\nu - 1}{\nu + 1}\right);$$

c) a second pair of torsion strain gauges mounted with free surfaces of the body at locations substantially the same distance, measured along the body axis, from one end of the body, and separated by substantially $\pi$ radians from each other, measured in a plane normal to the body axis, and mounted to gauge strain of the body at the negative of the first torsion angle to the body axis;

d) a first pair of force strain gauges mounted with free surfaces of the body at locations substantially the same distance, measured along the body axis, from one end of the body, and separated by substantially $\pi$ radians from each other, measured in a plane normal to the body axis, and mounted to gauge strain of the body at a first force angle to the body axis chosen from the group consisting of: substantially $$\frac{1}{2} \arccos\left(\frac{v-1}{v+1}\right),$$

and $$\text{substantially} -\frac{1}{2} \arccos\left(\frac{v-1}{v+1}\right);$$

e) a second pair of force strain gauges mounted with free surfaces of the body at locations substantially the same distance, measured along the body axis, from one end of the body, and separated by substantially π radians from each other, measured in a plane normal to the body axis, one of the second pair of force strain gauges mounted at substantially the negative of one of the first pair of force strain gauges, measured from the second axis in the plane normal to the body axis, and mounted to gauge strain of the body at the first force angle to the body axis;

f) means for indicating torsion load on the body from the first and second pairs of strain gauges; and g) means for indicating force load on the body from the first and second pairs of force strain gauges.

12. The load cell of the claim 11, wherein:

a) the torsion strain gauges comprise impedance strain gauges;

b) the force strain gauges comprise impedance strain gauges;

c) the means for indicating torsion load comprise a torsion four arm bridge, wherein:
   i) the first pair of torsion strain gauges are connected in opposite arms of the torsion bridge;
   ii) the second pair of torsion strain gauges are connected in opposite arms of the torsion bridge;
   iii) connections for an source of electrical energy between one pair of opposite nodes of the torsion bridge; and
   iv) connections for detecting electrical energy between the other pair of opposite nodes of the torsion bridge;

d) the means for indicating force load comprise a force four arm bridge, wherein:
   i) the first pair of force strain gauges are connected in opposite arms of the force bridge;
   ii) the second pair of force strain gauges are connected in opposite arms of the force bridge;
   iii) connections for an source of electrical energy between one pair of opposite nodes of the force bridge; and
   iv) connections for detecting electrical energy between the other pair of opposite nodes of the force bridge.

13. A load cell comprising:

a) an annular body having an axis and first and second ends, made from a material with a Poisson's ratio (v), and defining a coordinate system having a z-axis substantially parallel to the body axis, an x-axis substantially orthogonal to the z-axis, and a y-axis substantially orthogonal to both the x-axis and the z-axis;

b) four axial-load impedance strain gauges, denoted Pzg1, Pzg2, Pzg3, and Pzg4, mounted with free surfaces of the body at locations substantially the same distance, measured along the body axis, from one end of the body, and at azimuth locations, measured in a plane defined by the x-axis and y-axis relative to the x-axis, of a first Pz-azimuth for Pzg1, a second Pz-azimuth for Pzg2, the first Pz-azimuth plus π radians for Pzg3, and the second Pz-azimuth plus π radians for Pzg4, and mounted to gauge strain substantially parallel to the body axis for Pzg1 and Pzg3 and substantially normal to the body axis for Pzg2 and Pzg4, wherein a first terminal of Pzg1 is electrically connected to a first terminal of Pzg2, a second terminal of Pzg2 is electrically connected to a first terminal of Pzg3, a second terminal of Pzg3 is electrically connected to a first terminal of Pzg4, and a second terminal of Pzg4 is electrically connected to a second terminal of Pzg1;

c) four axial-moment impedance strain gauges, denoted Mzg1, Mzg2, Mzg3, and Mzg4, mounted with free surfaces of the body at locations substantially the same distance, measured along the body axis, from one end of the body, and at azimuth locations, measured in a plane defined by the x-axis and y-axis relative to the x-axis, of a first Mz-azimuth for Mzg1, a second Mz-azimuth for Mzg2, the first Mz-azimuth plus π radians for Mzg3, and the second Mz-azimuth plus π radians for Mzg4, and mounted to gauge strain at an angle to the body axis of substantially $$\frac{1}{2} \arccos\left(\frac{v-1}{v+1}\right)$$

for Mzg2 and Mzg4, and substantially $$-\frac{1}{2} \arccos\left(\frac{v-1}{v+1}\right)$$

for Mzg1 and Mzg3, wherein a first terminal of Mzg1 is electrically connected to a first terminal of Mzg2, a second terminal of Mzg2 is electrically connected to a first terminal of Mzg3, a second terminal of Mzg3 is electrically connected to a first terminal of Mzg4, and a second terminal of Mzg4 is electrically connected to a second terminal of Mzg1;

d) four x-force impedance strain gauges, denoted Pxg1, Pxg2, Pxg3, and Pxg4, mounted with free surfaces of the body at locations substantially the same distance, measured along the body axis, from one end of the body, and at azimuth locations, measured in a plane defined by the x-axis and y-axis relative to the x-axis, of a first Px-azimuth for Pxg1, the negative of the first Px-azimuth for Pxg2, π radians minus the first Px-azimuth for Pxg3, and π radians plus the first Px-azimuth for Pxg4, and mounted to gauge strain at an angle to the body axis chosen from the group consisting of: substantially $$\frac{1}{2} \arccos\left(\frac{v-1}{v+1}\right),$$

and substantially $$-\frac{1}{2} \arccos\left(\frac{v-1}{v+1}\right),$$

wherein a first terminal of Pxg1 is electrically connected to a first terminal of Pxg2, a second terminal of Pxg2 is electrically connected to a first terminal of Pxg3, a second terminal of Pxg3 is electrically connected to a first terminal of Pxg4, and a second terminal of Pxg4 is electrically connected to a second terminal of Pxg1;

e) four x-moment impedance strain gauges, denoted Mxg1, Mxg2, Mxg3, and Mxg4, mounted with free surfaces of the body at locations substantially the same distance, measured along the body axis, from one end of the body, and at azimuth locations, measured in a plane defined by the x-axis and y-axis relative to the x-axis, of a first Mx-azimuth for Mxg1, the negative of the first Mx-azimuth for Mxg2, π radians minus the first Mx-azimuth for Mxg3, and π radians plus the first Mx-azimuth for Mxg4, and mounted to gauge strain substantially parallel to the body axis, wherein a first terminal of Mxg1 is electrically connected to a first terminal of Mxg2, a second terminal of Mxg2 is electrically connected to a first terminal of Mxg3, a second terminal of Mxg3 is electrically connected to a first terminal of Mxg4, and a second terminal of Mxg4 is electrically connected to a second terminal of Mxg1;

f) four y-force impedance strain gauges, denoted Pyg1, Pyg2, Pyg3, and Pyg4, mounted with free surfaces of the body at locations substantially the same distance, measured along the body axis, from one end of the body, and at azimuth locations, measured in a plane defined by the x-axis and y-axis relative to the x-axis, of a first Py-azimuth for Pyg1, π radians minus the first Py-azimuth for Pyg2, the negative of the first Py-azimuth for Pyg3, and π radians plus the first Py-azimuth for Pyg3, and mounted to gauge strain at an angle to the body axis chosen from the group consisting of: substantially $$\frac{1}{2} \arccos\left(\frac{v-1}{v+1}\right),$$

and substantially $$-\frac{1}{2} \arccos\left(\frac{v-1}{v+1}\right),$$

wherein a first terminal of Pyg1 is electrically connected to a first terminal of Pyg2, a second terminal of Pyg2 is electrically connected to a first terminal of Pyg3, a second terminal of Pyg3 is electrically connected to a first terminal of Pyg4, and a second terminal of Pyg4 is electrically connected to a second terminal of Pyg1;

g) four y-moment impedance strain gauges, denoted Myg1, Myg2, Myg3, and Myg4, mounted with free surfaces of the body at locations substantially the same distance, measured along the body axis, from one end of the body, and at azimuth locations, measured in a plane defined by the x-axis and y-axis relative to the x-axis, of a first My-azimuth for Myg2, π radians minus the first My-azimuth for Mgy1, π radians plus the first My-azimuth for Myg3, and the negative of the first My-azimuth for Myg3, and mounted to gauge strain substantially parallel to the body axis, wherein a first terminal of Mgy1 is electrically connected to a first terminal of Myg2, a second terminal of Myg2 is electrically connected to a first terminal of Myg3, a second terminal of Myg3 is electrically connected to a first terminal of Myg4, and a second terminal of Myg4 is electrically connected to a second terminal of Mgy1.

14. A load cell, comprising:

a) a body;

b) a plurality of strain gauge sets, wherein each strain gauge set comprises at least one strain gauge, mounted with free surfaces of the body at locations wherein the load-strain equation for each strain gauge set is linearly independent of that for all the other strain gauge sets;

c) means for determining a load component from the combination of the outputs of the strain gauge sets.

* * * * *